(12) United States Patent
Jain et al.

(10) Patent No.: US 9,197,553 B2
(45) Date of Patent: Nov. 24, 2015

(54) USING A VIRTUAL INTERNET PROTOCOL ADDRESS TO REPRESENT DUALLY CONNECTED HOSTS IN AN INTERNET PROTOCOL OVERLAY NETWORK

(71) Applicant: Cisco Technology, Inc., San Jose, CA (US)

(72) Inventors: Vipin Jain, San Jose, CA (US); Ashutosh Agrawal, Fremont, CA (US); Parag Bhide, San Jose, CA (US); Mahidas Prabhanjan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 13/853,128

(22) Filed: Mar. 29, 2013

(65) Prior Publication Data

US 2014/0294005 A1    Oct. 2, 2014

(51) Int. Cl.
*H04L 12/713* (2013.01)
*H04L 12/773* (2013.01)
*H04L 29/12* (2006.01)

(52) U.S. Cl.
CPC .............. *H04L 45/586* (2013.01); *H04L 45/60* (2013.01); *H04L 61/103* (2013.01)

(58) Field of Classification Search
CPC ..... H04L 45/60; H04L 45/64; H04L 67/1074; H04L 67/1076; H04L 29/08468; H04L 29/12839; H04L 61/6022; H04L 45/58; H04L 45/72
USPC ................................................. 370/392, 397
See application file for complete search history.

(56) References Cited

U.S. PATENT DOCUMENTS

| | | | |
|---|---|---|---|
| 7,225,270 B2 * | 5/2007 | Barr et al. ..................... | 709/238 |
| 7,742,471 B2 * | 6/2010 | Sreejith et al. ................ | 370/389 |
| 8,504,718 B2 * | 8/2013 | Wang et al. ................... | 709/238 |
| 8,520,680 B1 * | 8/2013 | Doshi et al. ................... | 370/392 |
| 8,625,616 B2 * | 1/2014 | Vobbilisetty et al. ......... | 370/401 |
| 8,774,213 B2 * | 7/2014 | Vincent et al. ................ | 370/463 |
| 8,780,699 B1 * | 7/2014 | Hasan ........................... | 370/219 |
| 8,787,149 B1 * | 7/2014 | Ramanathan et al. ........ | 370/216 |
| 8,837,476 B2 * | 9/2014 | Banavalikar et al. ......... | 370/389 |
| 8,867,403 B2 * | 10/2014 | Biswas et al. ................. | 370/254 |
| 8,953,441 B2 * | 2/2015 | Nakil et al. .................... | 370/228 |
| 8,990,371 B2 * | 3/2015 | Kalyanaraman et al. ..... | 709/223 |
| 9,055,000 B1 * | 6/2015 | Ghosh et al. .......................... | 1/1 |
| 2004/0008682 A1 | 1/2004 | Miriyala | |
| 2011/0228670 A1 | 9/2011 | Sasso et al. | |
| 2011/0243136 A1 | 10/2011 | Ramen et al. | |

* cited by examiner

*Primary Examiner* — Edan Orgad
*Assistant Examiner* — Emmanuel Maglo
(74) *Attorney, Agent, or Firm* — Edell, Shapiro & Finnan, LLC (57) ABSTRACT

Techniques are presented herein for distributing address information of host devices in a network. At a first router device, a packet is received from a first host device that is destined for a second host device. The first host device is dually-connected to the first router and a second router device. The second router device is part of a virtual port channel pair with the first router device. A message is sent to the second router device, the message indicating that the first host device is connected to the second router device. The packet is encapsulated with an overlay header and is sent to a third router device that is connected to the second host device. The encapsulated packet contains a Layer 2 address associated with the first host device and a Layer 3 address associated with the first host device.

21 Claims, 5 Drawing Sheets

FIG.1

HOST/MAC TABLE @ R₃

| MAC, VNI | vTEP - IP |
|---|---|
| $M_1$, 20 | 3.3.3.3 |
| $M_3$, 20 | 1.1.1.1 |
| $M_2$, 20 | 4.4.4.4 / LOCAL |

IGP / ROUTE TABLE @ R₃

| IP | PATHS | COSTS |
|---|---|---|
| 1.1.1.1 / 32 | VIA $R_1$ | 100 |
| 2.2.2.2 / 32 | VIA $R_2$ | 100 |
| 3.3.3.3 / 32 | VIA $R_1$ | 100 |
|  | VIA $R_2$ | 100 |

USING A VIRTUAL INTERNET PROTOCOL ADDRESS TO REPRESENT DUALLY CONNECTED HOSTS IN AN INTERNET PROTOCOL OVERLAY NETWORK

TECHNICAL FIELD

The present disclosure relates to enabling communications between host devices in a network environment.

BACKGROUND

In typical network environments, host devices ("hosts") can connect to a network via one or more network devices that are routers and/or switches ("routers"). Multiple communication links may be present between the hosts and the routers. The communication links may be "active-active" communication links that enable communications between the hosts and a plurality of the routers via, e.g., a virtual port channel (vPC). In the "active-active" communication mode, each of the routers is configured to manage traffic to and from a host device, and in the event of a failure of one router, the other routers manage the traffic until the issue associated with the failed router is resolved. The communication links may also be "active-passive" communication links, where only one of the routers is configured to manage traffic to and from a host device, and in the event of a failure of the active router, the other inactive routers are "activated" in order to handle the communications associated with the host device.

These communication links may be part of a Layer 2 Ethernet channel. The hosts may be configured to host virtual machines. The virtual machines may send communications (e.g., packets) to each other. Virtual machines may "move" within the network when they are reassigned or otherwise hosted by different physical servers.

DESCRIPTION OF EXAMPLE EMBODIMENTS

Overview

Techniques are presented herein for associating virtual address information with a dually-connected host device and distributing the virtual address information in a network. At a first router device in a network, a packet is received from a first host device that is destined for a second host device in the network. The first host device is determined to be dually-connected to the first router device and a second router device in the network. The second router device is part of a virtual port channel pair with the first router device. When it is determined that the first host device is dually-connected to the first router device and the second router device, a message is sent to the second router device indicating that the first host device is connected to the second router device. The packet received from the first host device is encapsulated with an overlay header. The encapsulated packet is sent to a third router device that is connected to the second host device. The encapsulated packet contains a Layer 2 address associated with the first host device and a Layer 3 address associated with the first host device.

Example Embodiments

Figure 1:
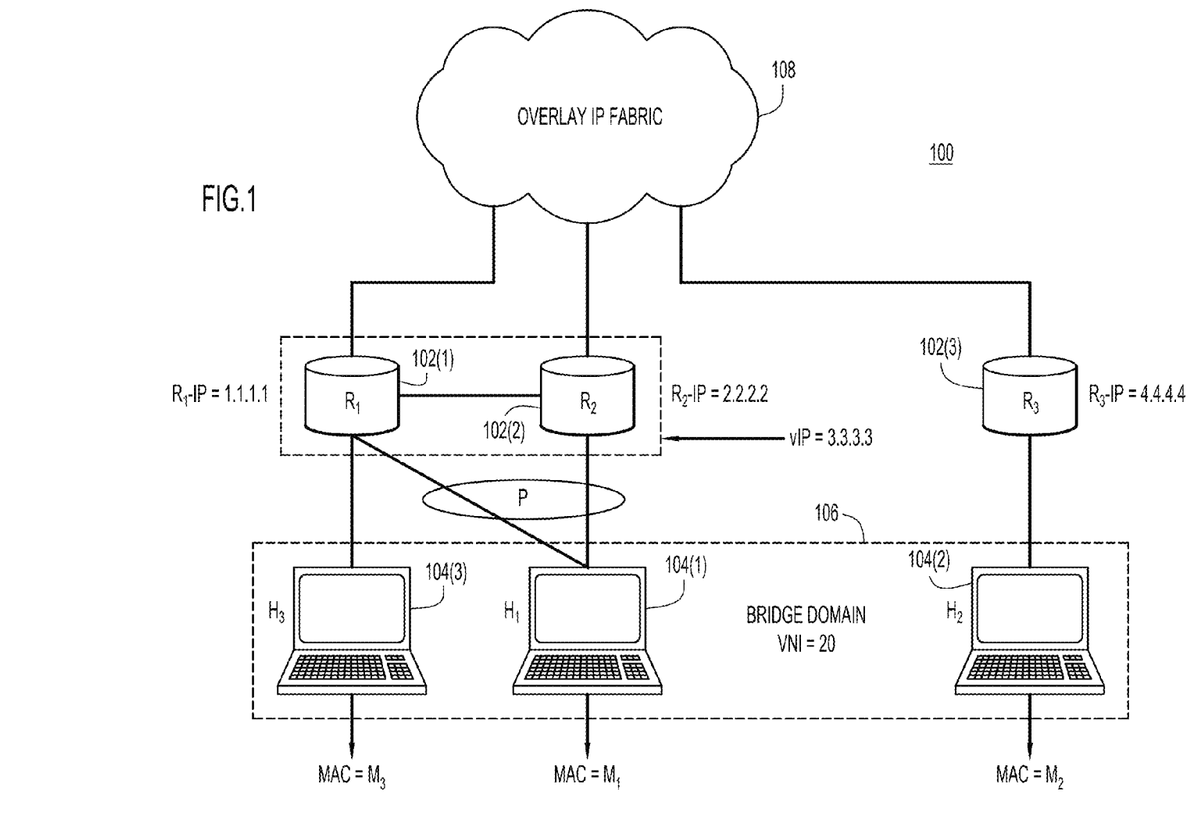
FIG. 1 shows an example network topology including a plurality of routers that are configured to distribute address information associated with host devices in an Internet Protocol based overlay network.

The techniques described hereinafter involve distributing address information associated with host devices in a network to a plurality of routers in the network. An example topology (hereinafter "network") is shown at reference numeral 100 in FIG. 1. The network 100 (e.g., an overlay network) comprises a plurality of router devices ("routers"), e.g., three routers in the example of FIG. 1, shown at reference numerals 102(1)-102(3). It should be appreciated that the term "router" as used herein may refer to a network device that is a router and/or switch. Router 102(1) may be referred to hereinafter as "router 1" or "R1," router 102(2) may be referred to hereinafter as "router 2" or "R2" and router 102(3) may be referred to hereinafter as "router 3" or "R3." FIG. 1 also shows a plurality of host devices ("hosts"), e.g., three host devices in the example of FIG. 1, shown at reference numerals 104(1)-104(3). Host device 104(1) may be referred to hereinafter as "host 1" or "H1," host device 104(2) may be referred to hereinafter as "host 2" or "H2," and host device 104(3) may be referred to hereinafter as "host 3" or "H3."

Each of the hosts 104(1)-104(3) may be dually-connected to two of the routers 102(1)-102(3). For example, as shown in FIG. 1, host 1 is dually-connected to router 1 and router 2 using port channel technology. That is, router 1 and router 2 belong to a virtual port channel (vPC) pair. Router 1 and router 2 are vPC peers connected via a peer link. Router 1 and router 2 are both configured to manage communications to and from host 1. As members of the vPC pair, router 1 and router 2 may present a single logical port (shown as port "P" in FIG. 1) to host 1, and this logical port may be mapped to physical ports on each of router 1 and router 2. Thus, host 1 is said to be "dually-connected" or "dually-homed" to both router 1 and router 2. From the perspective of host 1, it is logically connected to a single port, which is the vPC logical port that is presented to host 1 by router 1 and router 2. From the perspective of router 1 and router 2, a physical port of each of router 1 and router 2 is dedicated to service communications to and from host 1, and these physical ports are mapped to the logical vPC port presented to host 1.

Also, as shown in FIG. 1, host 2 may be connected to a physical port of router 3, and host 3 may be connected to a physical port of router 1. Thus, router 3 is configured to manage communications to and from host 2, and router 1 is configured to manage communications to and from host 3. Host 2 and host 3 are not dually-homed since they are not connected to a router via a vPC port.

Host 1, host 2 and host 3 are depicted in FIG. 1 as belonging to the same broadcast group or "bridge domain," which is depicted at reference numeral 106. For example, the bridge domain 106 may be a virtual local area network (VLAN) that includes host 1, host 2 and host 3. The bridge domain 106 is identified by a particular identifier (e.g., a virtual network identifier or VNI), and packets that are sent to devices (e.g., host 1 to host 3) in the bridge domain 106 are configured with this particular identifier. In one example, the bridge domain 106 is identified with a VNI identifier of "20," as shown in FIG. 1.

FIG. 1 also shows an overlay Internet Protocol (IP) fabric 108. The overlay IP fabric 108 is a network that includes routers 102(1)-102(3) and allows the routers 102(1)-102(3) to send encapsulated IP packets to each other, as described according the techniques presented herein. For example, host 1 may exchange communications with host 2 by exchanging encapsulated IP packets across the overlay IP fabric 108 via the respective routers associated with host 1 and host 2, as described herein.

Each of the host devices 104(1)-104(3) is assigned an Open Systems Interconnection (OSI) Layer 2 Media Access Control (MAC) address. For example, the MAC address of each of the host devices 104(1)-104(3) may be assigned by a manufacturer of the host devices. The MAC address for host 1 may be referred to hereinafter as "M1," the MAC address for host 2 may be referred to hereinafter as "M2" and the MAC address of host 3 may be referred to hereinafter as "M3." The routers 102(1)-102(3) are assigned IP addresses (e.g., Layer 3 addresses). Additionally, as stated above, since router 1 and router 2 belong to a vPC router pair, the vPC router pair itself is assigned a virtual IP (vIP) address. For example, FIG. 1 shows the IP address of router 1 as "1.1.1.1/32," the IP address of router 2 as "2.2.2.2/32," the IP address of the vPC router pair (comprised of router 1 and router 2) as "3.3.3.3/32" and the IP address of router 3 as "4.4.4.4/32." It should be appreciated that these IP addresses are merely examples, and that the IP addresses may be any IP address in compliance with IP version 4 (IPv4) and IP version 6 (IPv6) protocols.

As stated above, the host devices 104(1)-104(3) may exchange communications with each other across the overlay IP fabric 108. For example, host 1, which is managed by both router 1 and router 2 (that belong to a vPC router pair), may exchange communications with host 2, which is managed by router 3. Host 1 is connected to a logical vPC port that enables host 1 to communicate with both router 1 and router 2 to exchange communications in the network 100. In one example, host 1 may utilize its link (e.g., an Ethernet channel) to router 1 to send a packet that is destined for host 2. For example, the packet may be an Address Resolution Protocol (ARP) broadcast request message to request an address (e.g., a MAC address or an IP address) of host 2. The ARP broadcast request message lists the source address as the MAC address of host 1 ("M1"). Router 1, upon receiving the packet, obtains the source address listed in the packet, and identifies this source address as the MAC address corresponding to host 1. Since router 1 is already configured to manage host 1, the router 1 will already have the MAC address of router 1 stored in its routing table. Thus, upon receiving the packet, router 1 will look-up the source address in its routing table and will determine that the MAC address for host 1 is a local address since it is already stored in the routing table of router 1. Router 1 is also able to identify that host 1 is dually-homed to both router 1 and router 2 by evaluating the port on which the packet was received. As described above, since router 1 and router 2 are part of a vPC router pair, router 1 and router 2 present a single logical port (that is mapped to a physical port on both router 1 and router 2) to host 1. Thus, if the packet is received by router 1 at the physical port that is mapped to the single logical port, router 1 is able to determine that the packet was received from a device that is dually-homed with the other router device in its vPC router pair (i.e., router 2).

Upon determining that host 1 is dually-homed, router 1 sends a message to router 2 to indicate to router 2 that host 1 is linked to both router 1 and router 2 via the vPC port. Router 2 receives this message and stores the MAC address of host 1 in its routing table for synchronization between router 2 and router 1. In one example, router 2 may already have prior knowledge of the MAC address of host 1 since it is part of a vPC pair with router 1. In this example, router 2 receives the message and stores an IP address, e.g., a virtual IP ("vIP") address that is commonly associated with router 1 and router 2 in the vPC pair. After sending the message to router 2, router 1 then encapsulates the original packet with an overlay IP header. The overlay IP header lists the destination address as an address associated with a destination router (e.g., router 3) and lists the source address as the vIP address associated with the vPC router pair of router 1 and router 2 (i.e., IP address "3.3.3.3/32" as shown in FIG. 1 and described above).

When the router 1 sends the encapsulated packet with the overlay IP header to the overlay IP fabric 108, router 3 receives the encapsulated packet. Upon receiving the packet, router 3 undergoes an "address learning" process. That is, since router 3 has not received any prior packet originating from host 1, router 3 undergoes the address learning process in order to obtain the MAC address associated with host 1 and to store it in its routing table.

Router 3 also evaluates the source IP address of the IP overlay header, and determines that host 1 is reachable through the IP address that corresponds to the source IP address in the IP overlay header (i.e., the vIP for the vPC pair of router 1 and router 2). Router 3 stores this address information in its routing table. Thus, router 3, upon receiving the encapsulated packet from router 1 stores two types of address information in its routing table: the Layer 2 MAC address associated with host 1 and the Layer 3 IP address that corresponds to the source IP address in the IP overlay header. If, as in this example, the IP address in the overlay header corresponds to a vIP of a vPC router pair, then router 3 stores the vIP address as the IP address associated with host 1. If the IP address corresponds to a standard IP address of a router, then router 3 stores that IP address as the IP address. For example, in FIG. 1, host 3 is connected only to router 1 and is not dually-homed. Thus, router 1 uses its own standard IP address for overlay encapsulation for packets originating from host 3, and accordingly, when the address learning techniques for host 3 are performed, the router 3 will store the standard IP address associated with router 1 (e.g., IP address "1.1.1.1/32" in FIG. 1) and will associate the standard IP address of router 1 with host 3. Router 3 and other such routers in the network will have no special knowledge of the vIP address used by the routers in the vPC pair (e.g., the vIP address used by router 1 and router 2).

After receiving the encapsulated packet from router 1, router 3 de-encapsulates the packet by removing the IP overlay header and sends the ARP request message to host 2. Host 2, upon receiving the ARP request message, sends a unicast ARP response message, with the destination address set to the MAC address associated with host 1 and the source address associated with the MAC address of host 2. Router 3 receives the unicast ARP response message from host 2, and encapsulates the packet with an IP overlay header. In this encapsulated packet, the source address corresponds to the IP address of router 3 and the destination address is associated with the vIP address associated with the vPC router pair (due to router 3 learning the vIP address upon receiving the initial encapsulated packet from router 1). Since there are two potential paths to reach a router in the vPC pair (e.g., a path from router 3 to router 1 and a path from router 3 to router 2), router 3 selects a best path (e.g., an OSI layer 3 Equal Cost Multipath (ECMP) path) to reach the devices associated with the vIP (i.e., router 1 or router 2). For example, router 3 may select an ECMP best path to reach router 2. Router 2 receives the encapsulated packet and de-encapsulates it by removing the IP overlay header. Router 2 then evaluates the ARP response packet (resulting from the de-encapsulation), and identifies the destination address as that corresponding to the MAC address for host 1. Since router 2 had previously received the MAC address information of host 1 during the packet exchange between router 1 and router 2 (when router 1 received the initial ARP request packet from host 1), router 2 sends the ARP response packet to host 1 via the physical port of router 2 that is mapped to the vPC port that is logically connected to host 1. Additionally, by receiving the encapsulated packet from router 3, router 2 is able to undergo the address learning process to learn the MAC address associated with host 2 and is able to determine that host 2 is reachable through the IP address associated with router 3. Since router 1 and router 2 are vPC router pairs, router 2 sends a message with this information to router 1, thus informing router 1 of the MAC address associated with host 2 and that host 2 is reachable via the IP address associated with router 3. Router 1 and router 2 store this information in their respective routing tables. Subsequently, any unicast packet exchange between host 1 and host 2 will use the vIP and IP address of router 3 as the source IP and destination IP, respectively, in the overlay IP header as the packets are encapsulated.

Figure 2A:
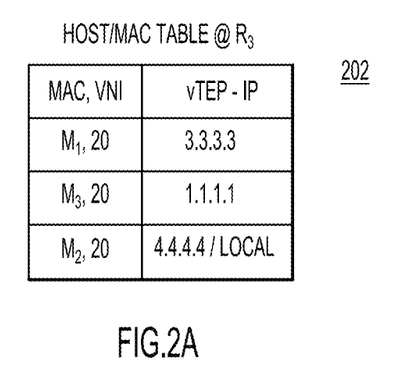
FIGS. 2A and 2B show examples of address information and routing path information stored in routing tables of the routers in the network.
Figure 2B:
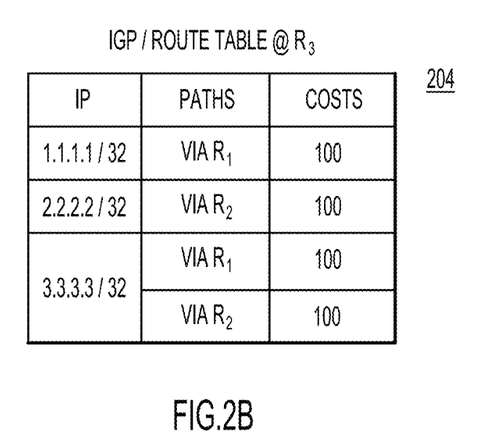

Reference is now made to FIGS. 2A and 2B. FIGS. 2A and 2B show examples of address information and routing path information stored in routing tables of a router (e.g., router 3) in the network 100. FIG. 2A shows the address information (e.g., the Virtual Tunnel Endpoint (VTEP) address or IP address) 202 stored in router 3. For example, routers that perform overlay encapsulation and de-encapsulation are also called VTEP devices. This distinguishes them from regular routers (i.e., "transit routers") that are unaware of overlay encapsulation. The address information 202 comprises the MAC address associated with each host in the network 100, as well as the IP address or vIP address, as the case may be, of the router or vPC router pair that manages each host. For example, address information 202 comprises the MAC address "M1" associated with host 1, the MAC address "M2" associated with host 2 and the MAC address "M3" associated with host 3. These MAC addresses are stored in the routing table by the routers using the address learning techniques described above. The MAC address for each host is mapped to the corresponding IP addresses or vIP address associated with the routers that manage the host devices. For example, MAC address "M1" is mapped to vIP address "3.3.3.3/32" associated with the vPC router pair including router 1 and router 2. MAC address "M2" is mapped to the IP address "4.4.4.4/32" associated with router 3. MAC address "M3" is mapped to the IP address "1.1.1.1/32" associated with router 1. The address information also contains the VNI that identifies the bridge domain 106 to which the hosts belong.

The routing path information is shown at reference numeral 204 in FIG. 2B. In FIG. 2B, each of the IP addresses (and vIP address) are mapped to a corresponding router via a router path. FIG. 2B shows, in general, typical routing information for a given set of IP destinations in an IP router. For example, IP address "1.1.1.1/32" is associated with router 1, and thus, the routing path associated with IP address "1.1.1.1/32" routes communications for router 1. The routing path information 202 shows a similar routing path for IP address 2.2.2.2/32, which is mapped to router 2. The routing path for vIP address "3.3.3.3/32" routes to both router 1 and router 2, since router 1 and router 2 belong to a vPC router pair that is associated with the vIP address. The routing path information 204 also shows the routing path costs associated with each of the routing paths. FIG. 2B also shows a routing path cost that is associated with each IP address. The routing path cost is in indicator of how close or far a specific route is from a reachability perspective of one or more of the routers. Routers often choose the shortest or best path to reach a specific destination (e.g., path with the lowest relative cost). The routing path cost values shown in FIG. 2B may be relative to one another, where relatively low routing path costs indicate relatively high levels of reachability and where relatively high routing path costs indicate relatively low levels of reachability.

Figure 3:
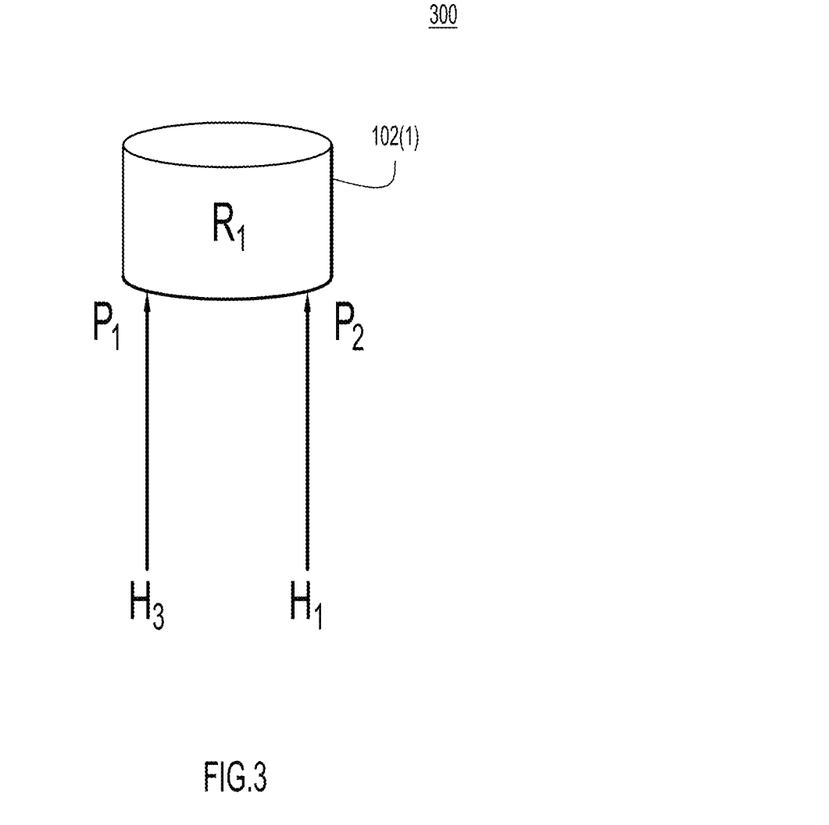
FIG. 3 shows an example of a router in the network with multiple physical ports that are configured to interface with one or more host devices in the network.

Reference is now made to FIG. 3, which shows an example of a router (e.g., router 1) in the network 100 with multiple physical ports. In FIG. 3, router 1 has two physical ports, shown at P1 and P2. Port P1 is connected to host 3, while port P2 is part of a vPC pair that is connected to host 1. The router 102(1) maintains a table that identifies whether or not each of its physical ports is a dually-connected (e.g., part of a vPC pair) port. As shown in Table 1 below, since port P1 of router 102(1) is not part of a vPC pair, port P1 is not dually-connected. Thus, as shown in Table 2 below, communications that are received via port P1 (i.e., from host 3) are assigned the IP address associated with router 102(1) (e.g., "1.1.1.1/32"). Likewise, as shown in Table 1, since port P2 of router 102(1) is part of a vPC pair, port P2 is a dually-connected port and is logically connected to the vPC port "P" in FIG. 1 that is presented to host 1. Therefore, as shown in Table 2, communications that are received via port P2 (i.e., from host 1 are assigned the vIP address associated with the vPC router pair (e.g., "3.3.3.3/32"). In Table 2, the Remote and Bridging fields indicate that a frame has been encapsulated on a remote endpoint (e.g., not on a switch or its vPC peer). In such cases, traffic may be forwarded based on an outer IP destination or a packet, though a source IP address may remain unchanged.

TABLE 1

| Port connectivity | |
|---|---|
| Port/Logical Interface | Dually-connected? |
| P1 | N |
| P2 | Y |

TABLE 2

| Egress communications table | |
|---|---|
| Originator | Source-IP to use |
| Local/Singly-connected | R1-IP = "1.1.1.1/32" |
| Local/Dually-connected | vIP = "3.3.3.3/32" |
| Remote and Bridging | Keep the source IP |

Figure 4:
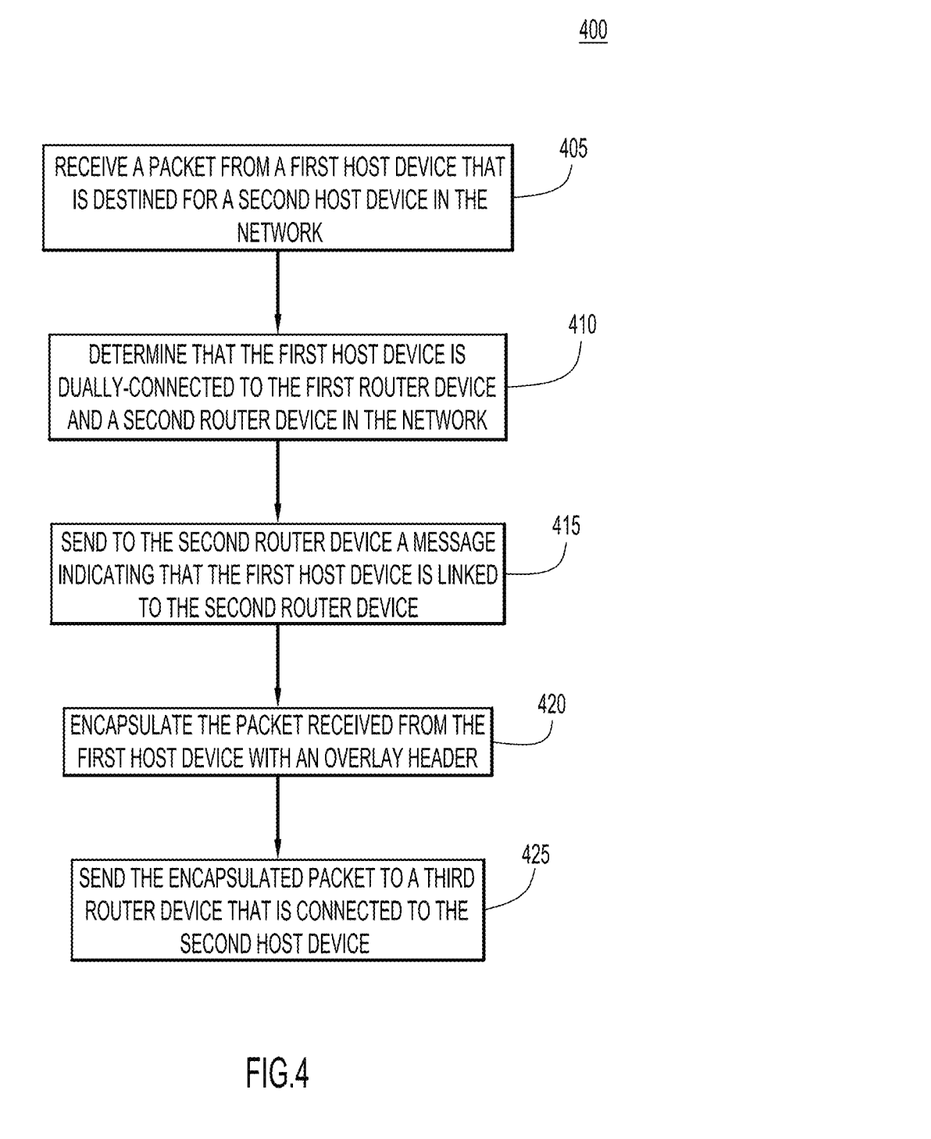
FIG. 4 shows an example flow chart depicting operations performed by one or more of the plurality of routers to distribute the address information of the host devices in the network.

Reference is now made to FIG. 4. FIG. 4 shows an example flow chart 400 depicting operations performed by one or more of the plurality of routers to distribute the address information of the host devices in the network. At 405, a packet is received from a first host device that is destined for a second host device in the network. At 410, a determination is made that the first host device is dually-connected to the first router device and a second router device in the network. The second router device, for example, is part of a vPC pair with the first router device. At operation 415, a message is sent to the second router device, the message indicating that the first host device is connected to the second router device. In one example, the first host device may be connected to the second router device via a vPC link (or another synchronization link) between the first host device and the second router device At operation 420, the packet received from the first host device is encapsulated with an overlay header. At operation 425, the encapsulated packet is sent to a third router device that is connected to the second host device. The encapsulated packet may be sent to the third router device via a best available path in the network.

Figure 5:
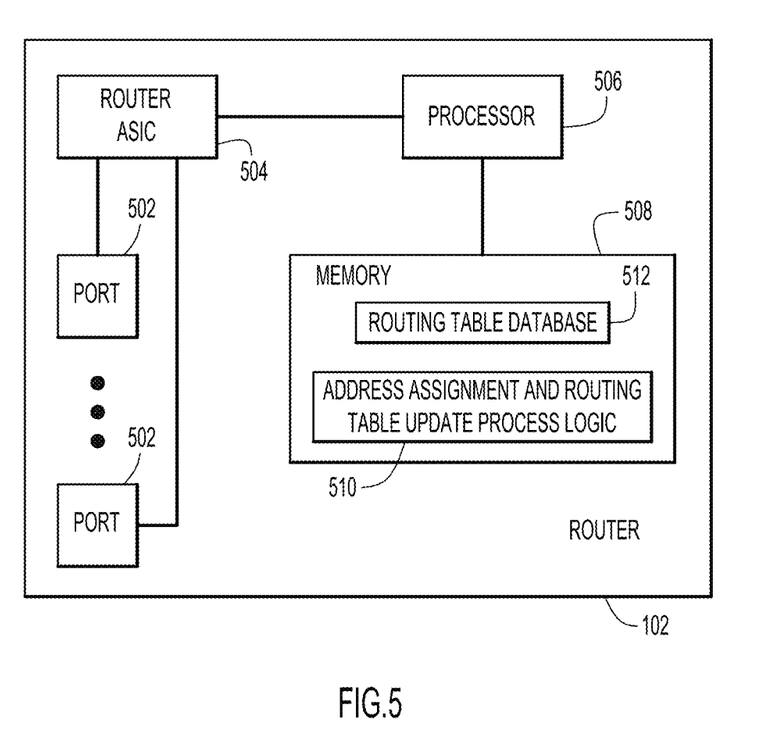
FIG. 5 shows an example block diagram of a router device that is configured to distribute the address information of the host devices in the network.

Reference is now made to FIG. 5, which shows an example of a block diagram of a router device ("router") configured to distribute the address information of the host devices in the network. The router device is shown generally at reference numeral 102, though it should be appreciated that the router device 102 may represent any of the routers 102(1)-102(3) described in connection with FIG. 1 above.

The router 102 comprises, among other components, a plurality of ports 502, a router application specific integrated circuit (ASIC) 504, a processor 506 and a memory 508. The ports 502 receive communications (e.g., packets) from host devices in a network and send communications to devices in the network 100. The ports 502 are coupled to the router ASIC 504. The router ASIC 504 forwards the packets to an appropriate one of the ports 502 for transmission to a destination network device in the network. The router ASIC 504 is coupled to the processor 506. The processor 506 is, for example, a microprocessor or microcontroller that is configured to execute program logic instructions (i.e., software) stored in memory 508 for carrying out various operations and tasks of the router 102, as described above. For example, the processor 506 is configured to execute address assignment and routing table update process logic 510 to assign an address to packets originating from host devices and to update its routing table database, shown at reference numeral 512, with address information of the host devices.

The functions of the processor 506 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

The memory 508 may comprise read only memory (ROM), random access memory (RAM), magnetic disk storage media devices, optical storage media devices, flash memory devices, electrical, optical, or other physical/tangible (non-transitory) memory storage devices. The memory 508 stores software instructions for the address assignment and routing table update process logic 510. Thus, in general, the memory 508 may comprise one or more computer readable storage media (e.g., a memory storage device) encoded with software comprising computer executable instructions and when the software is executed (e.g., by the processor 506) it is operable to perform the operations described for the address assignment and routing table update process logic 510.

The address assignment and routing table update process logic 510 may take any of a variety of forms, so as to be encoded in one or more tangible computer readable memory media or storage device for execution, such as fixed logic or programmable logic (e.g., software/computer instructions executed by a processor), and the processor 506 may be an ASIC that comprises fixed digital logic, or a combination thereof.

For example, the processor 506 may be embodied by digital logic gates in a fixed or programmable digital logic integrated circuit, which digital logic gates are configured to perform the address assignment and routing table update process logic 510. In general, the process logic 510 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the routers herein may be performed by one or more computer or machine readable storage media (non-transitory) or device executed by a processor and comprising software, hardware or a combination of software and hardware to perform the techniques described herein.

In sum, a method is provided comprising: at a first router device in a network, receiving a packet from a first host device that is destined for a second host device in the network; determining that the first host device is dually-connected to the first router device and a second router device in the network, wherein the second router device is part of a virtual port channel pair with the first router device; when it is determined that the first host device is dually-connected to the first router device and the second router device, sending to the second router device a message indicating that the first host device is connected to the second router device; encapsulating the packet received from the first host device with an overlay header; and sending the encapsulated packet to a third router device that is connected to the second host device, wherein the encapsulated packet contains a Layer 2 address associated with the first host device and a Layer 3 address associated with the first host device.

Additionally, an apparatus is provided, comprising: a plurality of ports; a memory; and a processor coupled to the memory and configured to: receive a packet from a first host device that is destined for a second host device in the network; determine that the first host device is dually-connected to a first router device and a second router device in the network, wherein the second router device is part of a virtual port channel pair with the first router device; when it is determined that the first host device is dually-connected to the first router device and the second router device, generate a message to be sent to the second router device, the message indicating that the first host device is connected to the second router device; encapsulate the packet received from the first host device with an overlay header; and cause the encapsulated packet to be sent to a third router device that is connected to the second host device, wherein the encapsulated packet contains a Layer 2 address associated with the first host device and a Layer 3 address associated with the first host device.

In addition, a computer-readable storage media is provided that is encoded with software comprising computer executable instructions and when the software is executed it is operable to: receive a packet from a first host device that is destined for a second host device in the network; determine that the first host device is dually-connected to a first router device and a second router device in the network, wherein the second router device is part of a virtual port channel pair with the first router device; when it is determined that the first host device is dually-connected to the first router device and the second router device, send to the second router device a message indicating that the first host device is connected to the second router device; encapsulate the packet received from the first host device with an overlay header; and cause the encapsulated packet to be sent to a third router device that is connected to the second host device, wherein the encapsulated packet contains a Layer 2 address associated with the first host device and a Layer 3 address associated with the first host device.

The above description is intended by way of example only. Various modifications and structural changes may be made therein without departing from the scope of the concepts described herein and within the scope and range of equivalents of the claims.

What is claimed is:

1. A method comprising:
   at a first router device in a network, receiving a packet from a first host device that is destined for a second host device in the network;
   determining that the first host device is dually-connected to the first router device and a second router device in the network, wherein the second router device is part of a virtual port channel pair with the first router device and the virtual port channel pair has a Layer 3 address commonly associated with the first router device and the second router device;
   when it is determined that the first host device is dually-connected to the first router device and the second router device, sending to the second router device a message indicating that the first host device is connected to the second router device;
   encapsulating the packet received from the first host device with an overlay header; and
   sending the encapsulated packet to a third router device that is connected to the second host device, wherein the encapsulated packet contains a Layer 2 address associated with the first host device and the Layer 3 address commonly associated with the first router device and the second router device.

2. The method of claim 1, wherein sending the message comprises sending to the second router device the message with information that allows the second router device to ignore learning the Layer 2 address and Layer 3 address when the second router device receives the encapsulated packet.

3. The method of claim 1, wherein sending the message comprises sending to the second router device the message with information that indicates to the second router device that the first host device is accessible by the second router device via a local link between the second router device and the first host device.

4. The method of claim 1, wherein encapsulating comprises encapsulating the packet with an Internet Protocol overlay header that comprises an Internet Protocol address assigned to the first host device.

5. The method of claim 1, further comprising assigning an Internet Protocol address to the first host device before encapsulating the packet with the overlay header.

6. The method of claim 5, wherein assigning comprises assigning the Internet Protocol address from a database of Internet Protocol addresses, wherein the database is local to the first router device and the second router device.

7. The method of claim 1, further comprising:
   receiving a response packet from the second host device; and
   storing Layer 2 address information and Layer 3 address information associated with the second host device.

8. The method of claim 1, wherein sending the encapsulated packet to the third router device comprises sending the encapsulated packet to the third router device via a best available path in the network.

9. An apparatus comprising:
   a plurality of ports configured to send and receive communications over a network;
   a memory; and
   a processor coupled to the memory and configured to:
   receive a packet from a first host device that is destined for a second host device in the network;
   determine that the first host device is dually-connected to a first router device and a second router device in the network, wherein the second router device is part of a virtual port channel pair with the first router device and the virtual port channel pair has a Layer 3 address commonly associated with the first router device and the second router device;
   when it is determined that the first host device is dually-connected to the first router device and the second router device, generate a message to be sent to the second router device, the message indicating that the first host device is connected to the second router device;
   encapsulate the packet received from the first host device with an overlay header; and
   send the encapsulated packet to a third router device that is connected to the second host device, wherein the encapsulated packet contains a Layer 2 address associated with the first host device and the Layer 3 address commonly associated with the first router device and the second router device.

10. The apparatus of claim 9, wherein the processor is further configured to generate and send to the second router device the message with information that allows the second router device to ignore learning the Layer 2 address and Layer 3 address when the second router device receives the encapsulated packet.

11. The apparatus of claim 9, wherein the processor is further configured to generate and send to the second router device the message with information that indicates to the second router device that the first host device is accessible by the second router device via a local link between the second router device and the first host device.

12. The apparatus of claim 9, wherein the processor is further configured to encapsulate the packet with an Internet Protocol overlay header that comprises an Internet Protocol address assigned to the first host device.

13. The apparatus of claim 9, wherein the processor is further configured to assign an Internet Protocol address to the first host device before encapsulating the packet with the overlay header.

14. The apparatus of claim 13, wherein the processor is further configured to assign the Internet Protocol address from a database of Internet Protocol addresses, wherein the database is local to the first router device and the second router device.

15. The apparatus of claim 9, wherein the processor is further configured to:
   receive a response packet from the second host device; and
   store Layer 2 address information and Layer 3 address information associated with the second host device.

16. A non-transitory computer-readable storage media encoded with software comprising computer executable instructions and when the software is executed operable to:
   receive a packet from a first host device that is destined for a second host device in the network;
   determine that the first host device is dually-connected to a first router device and a second router device in the network, wherein the second router device is part of a virtual port channel pair with the first router device and the virtual port channel pair has a Layer 3 address commonly associated with the first router device and the second router device;
   when it is determined that the first host device is dually-connected to the first router device and the second router device, generate a message to be sent to the second router device, the message indicating that the first host device is connected to the second router device;

encapsulate the packet received from the first host device with an overlay header; and cause the encapsulated packet to be sent to a third router device that is connected to the second host device, wherein the encapsulated packet contains a Layer 2 address associated with the first host device and the Layer 3 address commonly associated with the first router device and the second router device.

17. The non-transitory computer-readable storage media of claim 16, wherein the instructions that are operable to generate and send the message comprise instructions that are operable to generate and send to the second router device a message with information that allows the second router device to ignore learning the Layer 2 address and Layer 3 address when the second router device receives the encapsulated packet.

18. The non-transitory computer-readable storage media of claim 16, wherein the instructions operable to generate and send the message comprise instructions operable to generate and send to the second router device a message with information that indicates to the second router device that the first host device is accessible by the second router device via a local link between the second router device and the first host device.

19. The non-transitory computer-readable storage media of claim 16, wherein the instructions operable to encapsulate comprise instructions operable to encapsulate the packet with an Internet Protocol overlay header that comprises an Internet Protocol address assigned to the first host device.

20. The non-transitory computer-readable storage media of claim 16, further comprising instructions operable to assign an Internet Protocol address to the first host device before encapsulating the packet with the overlay header.

21. The non-transitory computer-readable storage media of claim 20, wherein the instructions operable to assign comprise instructions operable to assign the Internet Protocol address from a database of Internet Protocol addresses, wherein the database is local to the first router device and the second router device.

\* \* \* \* \*